United States Patent
Keithley et al.

(10) Patent No.: US 8,643,661 B1
(45) Date of Patent: Feb. 4, 2014

(54) NON RASTER ROW PIXEL PROCESSING

(75) Inventors: Douglas G. Keithley, Boise, ID (US); Gordon R. Clark, Meridian, ID (US); John D. Marshall, Meridian, ID (US); William R. Schmidt, Boise, ID (US)

(73) Assignee: Marvell International Ltd. (BM)

( * ) Notice: Subject to any disclaimer, the term of this patent is extended or adjusted under 35 U.S.C. 154(b) by 1546 days.

(21) Appl. No.: 11/801,884

(22) Filed: May 11, 2007

Related U.S. Application Data

(60) Provisional application No. 60/815,332, filed on Jun. 21, 2006.

(51) Int. Cl.
G09G 5/36 (2006.01)

(52) U.S. Cl.
USPC ............ 345/560; 345/530; 345/501; 345/519

(58) Field of Classification Search
USPC .......... 345/560, 530, 611, 418; 382/232, 244, 382/162, 168
See application file for complete search history.

(56) References Cited

U.S. PATENT DOCUMENTS

| | | | |
|---|---|---|---|
| 5,825,367 A | 10/1998 | Shyu et al. | |
| 6,239,847 B1 | 5/2001 | Deierling | |
| 7,286,720 B2 | 10/2007 | Uedo | |
| 7,536,062 B2 | 5/2009 | Lippincott | |
| 2002/0196260 A1 | 12/2002 | Candler et al. | |
| 2004/0046773 A1 | 3/2004 | Inoue et al. | |
| 2004/0160452 A1* | 8/2004 | Song et al. | 345/560 |
| 2006/0061827 A1 | 3/2006 | Moss et al. | |
| 2006/0104603 A1* | 5/2006 | Worry et al. | 386/46 |
| 2007/0177056 A1* | 8/2007 | Zhou et al. | 348/452 |
| 2008/0069465 A1* | 3/2008 | Higashi | 382/247 |

* cited by examiner

Primary Examiner — Chante Harrison

(57) ABSTRACT

A system and method for processing digital images that efficiently buffers pixel data relating to digital images is disclosed. Pixel values are read from an image storage memory and temporarily stored in a buffer memory according to a non-raster pattern. The processing of pixels also occurs according to a more efficient non-raster pattern.

42 Claims, 9 Drawing Sheets

| | | | | | | | | | |
|---|---|---|---|---|---|---|---|---|---|
| (0,0) | (0,1) | (0,2) | (0,3) | (0,4) | (0,5) | (0,6) | ...... | (0,n-1) | (0,n) |
| (1,0) | (1,1) | (1,2) | (1,3) | (1,4) | (1,5) | (1,6) | ...... | (1,n-1) | (1,n) |
| (2,0) | (2,1) | (2,2) | (2,3) | (2,4) | (2,5) | (2,6) | ...... | (2,n-1) | (2,n) |
| (3,0) | (3,1) | (3,2) | (3,3) | (3,4) | (3,5) | (3,6) | ...... | (3,n-1) | (3,n) |
| (4,0) | (4,1) | (4,2) | (4,3) | (4,4) | (4,5) | (4,6) | ...... | (4,n-1) | (4,n) |
| (5,0) | (5,1) | (5,2) | (5,3) | (5,4) | (5,5) | (5,6) | ...... | (5,n-1) | (5,n) |
| (6,0) | (6,1) | (6,2) | (6,3) | (6,4) | (6,5) | (6,6) | ...... | (6,n-1) | (6,n) |
| (7,0) | (7,1) | (7,2) | (7,3) | (7,4) | (7,5) | (7,6) | ...... | (7,n-1) | (7,n) |
| (8,0) | (8,1) | (8,2) | (8,3) | (8,4) | (8,5) | (8,6) | ...... | (8,n-1) | (8,n) |
| (9,0) | (9,1) | (9,2) | (9,3) | (9,4) | (9,5) | (9,6) | ...... | (9,n-1) | (9,n) |
| (10,0) | (10,1) | (10,2) | (10,3) | (10,4) | (10,5) | (10,6) | ...... | (10,n-1) | (10,n) |
| (11,0) | (11,1) | (11,2) | (11,3) | (11,4) | (11,5) | (11,6) | ...... | (11,n-1) | (11,n) |
| (12,0) | (12,1) | (12,2) | (12,3) | (12,4) | (12,5) | (12,6) | ...... | (12,n-1) | (12,n) |
| (13,0) | (13,1) | (13,2) | (13,3) | (13,4) | (13,5) | (13,6) | ...... | (13,n-1) | (13,n) |
| (14,0) | (14,1) | (14,2) | (14,3) | (14,4) | (14,5) | (14,6) | ...... | (14,n-1) | (14,n) |
| (15,0) | (15,1) | (15,2) | (15,3) | (15,4) | (15,5) | (15,6) | ...... | (15,n-1) | (15,n) |
| (16,0) | (16,1) | (16,2) | (16,3) | (16,4) | (16,5) | (16,6) | ...... | (16,n-1) | (16,n) |
| (17,0) | (17,1) | (17,2) | (17,3) | (17,4) | (17,5) | (17,6) | ...... | (17,n-1) | (17,n) |
| (18,0) | (18,1) | (18,2) | (18,3) | (18,4) | (18,5) | (18,6) | ...... | (18,n-1) | (18,n) |
| (19,0) | (19,1) | (19,2) | (19,3) | (19,4) | (19,5) | (19,6) | ...... | (19,n-1) | (19,n) |
| (20,0) | (20,1) | (20,2) | (20,3) | (20,4) | (20,5) | (20,6) | ...... | (20,n-1) | (20,n) |
| (21,0) | (21,1) | (21,2) | (21,3) | (21,4) | (21,5) | (21,6) | ...... | (21,n-1) | (21,n) |
| (22,0) | (22,1) | (22,2) | (22,3) | (22,4) | (22,5) | (22,6) | ...... | (22,n-1) | (22,n) |
| (23,0) | (23,1) | (23,2) | (23,3) | (23,4) | (23,5) | (23,6) | ...... | (23,n-1) | (23,n) |
| (24,0) | (24,1) | (24,2) | (24,3) | (24,4) | (24,5) | (24,6) | ...... | (24,n-1) | (24,n) |
| (25,0) | (25,1) | (25,2) | (25,3) | (25,4) | (25,5) | (25,6) | ...... | (25,n-1) | (25,n) |
| (26,0) | (26,1) | (26,2) | (26,3) | (26,4) | (26,5) | (26,6) | ...... | (26,n-1) | (26,n) |
| (27,0) | (27,1) | (27,2) | (27,3) | (27,4) | (27,5) | (27,6) | ...... | (27,n-1) | (27,n) |
| (28,0) | (28,1) | (28,2) | (28,3) | (28,4) | (28,5) | (28,6) | ...... | (28,n-1) | (28,n) |
| (29,0) | (29,1) | (29,2) | (29,3) | (29,4) | (29,5) | (29,6) | ...... | (29,n-1) | (29,n) |
| (30,0) | (30,1) | (30,2) | (30,3) | (30,4) | (30,5) | (30,6) | ...... | (30,n-1) | (30,n) |
| (31,0) | (31,1) | (31,2) | (31,3) | (31,4) | (31,5) | (31,6) | ...... | (31,n-1) | (31,n) |
| (32,0) | (32,1) | (32,2) | (32,3) | (32,4) | (32,5) | (32,6) | ...... | (32,n-1) | (32,n) |
| (33,0) | (33,1) | (33,2) | (33,3) | (33,4) | (33,5) | (33,6) | ...... | (33,n-1) | (33,n) |
| (34,0) | (34,1) | (34,2) | (34,3) | (34,4) | (34,5) | (34,6) | ...... | (34,n-1) | (34,n) |
| (35,0) | (35,1) | (35,2) | (35,3) | (35,4) | (35,5) | (35,6) | ...... | (35,n-1) | (35,n) |
| (36,0) | (36,1) | (36,2) | (36,3) | (36,4) | (36,5) | (36,6) | ...... | (36,n-1) | (36,n) |
| ...... | ...... | ...... | ...... | ...... | ...... | ...... | ...... | ...... | ...... |
| ...... | ...... | ...... | ...... | ...... | ...... | ...... | ...... | ...... | ...... |
| (r-1,0) | (r-1,1) | (r-1,2) | (r-1,3) | (r-1,4) | (r-1,5) | (r-1,6) | ...... | (r-1,n-1) | (r-1,0) |
| (r,0) | (r,1) | (r,2) | (r,3) | (r,4) | (r,5) | (r,6) | ...... | (r,n-1) | (r,n) |

| | 66 | 68 | 70 | 72 | 74 | 76 | 78 | | 80 | 82 |
|---|---|---|---|---|---|---|---|---|---|---|
| | (0,0) | (0,1) | (0,2) | (0,3) | (0,4) | (0,5) | (0,6) | ...... | (0,n-1) | (0,n) |
| | (1,0) | (1,1) | (1,2) | (1,3) | (1,4) | (1,5) | (1,6) | ...... | (1,n-1) | (1,n) |
| | (2,0) | (2,1) | (2,2) | (2,3) | (2,4) | (2,5) | (2,6) | ...... | (2,n-1) | (2,n) |
| | (3,0) | (3,1) | (3,2) | (3,3) | (3,4) | (3,5) | (3,6) | ...... | (3,n-1) | (3,n) |
| | (4,0) | (4,1) | (4,2) | (4,3) | (4,4) | (4,5) | (4,6) | ...... | (4,n-1) | (4,n) |
| | (5,0) | (5,1) | (5,2) | (5,3) | (5,4) | (5,5) | (5,6) | ...... | (5,n-1) | (5,n) |
| | (6,0) | (6,1) | (6,2) | (6,3) | (6,4) | (6,5) | (6,6) | ...... | (6,n-1) | (6,n) |
| 62 | (7,0) | (7,1) | (7,2) | (7,3) | (7,4) | (7,5) | (7,6) | ...... | (7,n-1) | (7,n) |
| | (8,0) | (8,1) | (8,2) | (8,3) | (8,4) | (8,5) | (8,6) | ...... | (8,n-1) | (8,n) |
| | (9,0) | (9,1) | (9,2) | (9,3) | (9,4) | (9,5) | (9,6) | ...... | (9,n-1) | (9,n) |
| | (10,0) | (10,1) | (10,2) | (10,3) | (10,4) | (10,5) | (10,6) | ...... | (10,n-1) | (10,n) |
| | (11,0) | (11,1) | (11,2) | (11,3) | (11,4) | (11,5) | (11,6) | ...... | (11,n-1) | (11,n) |
| | (12,0) | (12,1) | (12,2) | (12,3) | (12,4) | (12,5) | (12,6) | ...... | (12,n-1) | (12,n) |
| | (13,0) | (13,1) | (13,2) | (13,3) | (13,4) | (13,5) | (13,6) | ...... | (13,n-1) | (13,n) |
| | (14,0) | (14,1) | (14,2) | (14,3) | (14,4) | (14,5) | (14,6) | ...... | (14,n-1) | (14,n) |
| | (15,0) | (15,1) | (15,2) | (15,3) | (15,4) | (15,5) | (15,6) | ...... | (15,n-1) | (15,n) |

Fig. 10

| | 66 | 68 | 70 | 72 | 74 | 76 | 78 | | 80 | 82 |
|---|---|---|---|---|---|---|---|---|---|---|
| | (12,0) | (12,1) | (12,2) | (12,3) | (12,4) | (12,5) | (12,6) | ...... | (12,n-1) | (12,n) |
| | (13,0) | (13,1) | (13,2) | (13,3) | (13,4) | (13,5) | (13,6) | ...... | (13,n-1) | (13,n) |
| | (14,0) | (14,1) | (14,2) | (14,3) | (14,4) | (14,5) | (14,6) | ...... | (14,n-1) | (14,n) |
| | (15,0) | (15,1) | (15,2) | (15,3) | (15,4) | (15,5) | (15,6) | ...... | (15,n-1) | (15,n) |
| | (16,0) | (16,1) | (16,2) | (16,3) | (16,4) | (16,5) | (16,6) | ...... | (16,n-1) | (16,n) |
| | (17,0) | (17,1) | (17,2) | (17,3) | (17,4) | (17,5) | (17,6) | ...... | (17,n-1) | (17,n) |
| | (18,0) | (18,1) | (18,2) | (18,3) | (18,4) | (18,5) | (18,6) | ...... | (18,n-1) | (18,n) |
| 64 | (19,0) | (0,1) | (0,2) | (0,3) | (0,4) | (0,5) | (0,6) | ...... | (0,n-1) | (0,n) |
| | (20,0) | (20,1) | (20,2) | (20,3) | (20,4) | (20,5) | (20,6) | ...... | (20,n-1) | (20,n) |
| | (21,0) | (21,1) | (21,2) | (21,3) | (21,4) | (21,5) | (21,6) | ...... | (21,n-1) | (21,n) |
| | (22,0) | (22,1) | (22,2) | (22,3) | (22,4) | (22,5) | (22,6) | ...... | (22,n-1) | (22,n) |
| | (23,0) | (23,1) | (23,2) | (23,3) | (23,4) | (23,5) | (23,6) | ...... | (23,n-1) | (23,n) |
| | (24,0) | (24,1) | (24,2) | (24,3) | (24,4) | (24,5) | (24,6) | ...... | (24,n-1) | (24,n) |
| | (25,0) | (25,1) | (25,2) | (25,3) | (25,4) | (25,5) | (25,6) | ...... | (25,n-1) | (25,n) |
| | (26,0) | (26,1) | (26,2) | (26,3) | (26,4) | (26,5) | (26,6) | ...... | (26,n-1) | (26,n) |
| | (27,0) | (27,1) | (27,2) | (27,3) | (27,4) | (27,5) | (27,6) | ...... | (27,n-1) | (27,n) |

Fig. 11

NON RASTER ROW PIXEL PROCESSING

RELATED APPLICATION

This application claims the benefit of U.S. Provisional Application No. 60/815,332, filed Jun. 21, 2006, which is incorporated herein by reference.

BACKGROUND

The present invention relates to digital image processing systems and methods for efficiently buffering pixel values relating to digital images. Digital image processing typically follows a rasterized path. Pixel values are read and processed from left to right within a single line, and lines are processed from top to bottom. Many image processing operations such as filtering and scaling operate on areas that span multiple lines and columns of a digital image. For these types of operations, line buffering is necessary to temporarily store pixel values for multiple lines. Even though an area based algorithm may only use a small number of pixels within a given line, the entire line must be buffered when data from subsequent lines are also required.

When an image processing operation is implemented in hardware, the resolution and image width will define the amount of memory, typically SRAM, needed for buffering. If the line resolution doubles, the amount of memory doubles. Typically the amount of SRAM available for buffering is fixed within an Application Specific Integrated Circuit (ASIC) implementing the desired function. Thus, a decision regarding the size of the buffer must be made early on in a design project in which line buffering will be required. If a later product needs more buffering, or if specifications change, the ASIC must be re-designed. This can add significant cost and delay to the project.

BRIEF SUMMARY

The present invention is defined by the claims, and nothing in this section should be taken as a limitation on those claims. By way of introduction, the preferred embodiments described below provide systems and methods for processing digital image data.

In one preferred embodiment, a system is provided for processing digital image data. The system includes an image storage memory adapted to store digital image data as a two-dimensional pixel array having a plurality of rows and plurality of columns of pixel values. A buffer memory is also provided for temporarily storing pixel values. An image processor is adapted to control the image storage memory and the buffer memory so that pixel values are selectively read from the image storage memory and temporarily stored in the buffer memory. The pixel values are read from the image storage memory and stored in the buffer memory in a non-raster pattern based on a plurality of horizontal pixel strips. Each pixel strip includes a plurality of rows of pixel values. The image processor is further adapted to access the pixel values temporarily stored in the buffer memory and perform image processing functions on the buffered pixels.

In another preferred embodiment, a method of buffering pixel values for a digital image is provided. The pixels of a digital image are organized in a two-dimensional pixel array having a plurality of pixel rows and pixel columns. The method includes defining a plurality of pixel strips. The pixel strips each include a plurality of pixel rows. Pixel values from a first pixel strip are temporarily stored in a buffer memory in a non-raster pattern. The method next includes processing the pixel values temporarily stored in the buffer memory. When the processing of the pixel values from the first pixel strip is complete, pixel values from a second pixel strip are then temporarily stored in the buffer memory in a non-raster pattern. Finally, the pixel values from the second pixel strip temporarily stored in the buffer memory are processed.

In yet another embodiment, a method of processing a digital image is provided. The method includes storing a digital image as a two-dimensional array of pixel values. The two-dimensional array includes a plurality of rows and columns. The method further includes defining a plurality of overlapping pixel strips. Each pixel strip includes a plurality of rows of pixels. Finally, the method calls for sequentially processing the pixel values of the pixels in each overlapping pixel strip.

Other preferred embodiments are provided, and each of the preferred embodiments described herein can be used alone or in combination with one another. The preferred embodiments will now be described with reference to the attached drawings.

BRIEF DESCRIPTION OF THE DRAWINGS

FIG. 2 is a typical digital image pixel array;

FIG. 3 is a typical digital image pixel array on which a filtering operation employing a 5×5 pixel filtering array and traditional line buffering is implemented;

FIG. 4 is a typical digital image pixel array with a first horizontal pixel strip;

FIG. 5 is a typical digital image pixel array with a second horizontal pixel strip;

FIG. 6 is a first horizontal pixel strip illustrating a non raster pattern for processing pixel values;

FIG. 7 is a first horizontal pixel strip on which a filtering operation employing a 5×5 pixel filtering array and non-raster buffering are implemented;

FIG. 8 is the horizontal pixel strip of FIG. 7 with the 5×5 pixel filtering array positioned to calculate a filtered value for a next pixel of interest;

FIG. 9 is the horizontal pixel strip of FIG. 7 with the 5×5 pixel filtering array positioned to calculate a filtered value for yet another pixel of interest;

FIG. 10 is the horizontal pixel strip of FIG. 7 with the 5×5 pixel filtering array positioned to calculate a filtered value for still another pixel of interest;

FIG. 11 is a next horizontal pixel strip with the 5×5 pixel filtering array positioned to calculate a filtered value for a first pixel of interest within a second pixel strip;

DETAILED DESCRIPTION OF THE PRESENTLY PREFERRED EMBODIMENTS

Figure 1:
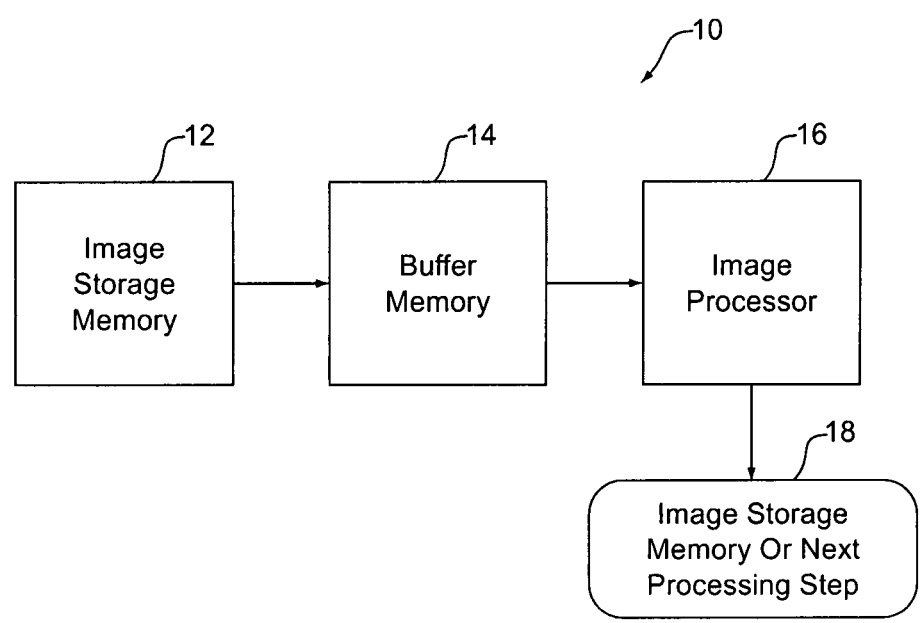
FIG. 1 is a block diagram of a digital image processing system.

FIG. 1 is a block diagram of a digital image processing system 10. The digital image processing system 10 may be a stand-alone system, or may be a component of a larger, more complex image processing system. For example, the digital image processing system 10 may be a filtering system for filtering digital images within a scanner, printer, copier, or some other image processing device. The digital image processing system 10 includes an image storage memory 12, a buffer memory 14, and an image processor 16. The image storage memory 12 may be a mass storage device such as an optical and/or magnetic storage device, for example a hard disk drive (HDD), digital versatile disk (DVD), dynamic random access memory (DRAM), or any other data storage device that stores data in a nonvolatile manner. The buffer memory 14 may be a random access memory (RAM), a DRAM, a static random access memory (SRAM), a low latency nonvolatile memory such as flash memory, and/or any other suitable electronic data storage medium.

The image processor 16 manipulates the pixel values of digital images processed by the image processing system 10. The image processor 16 may be any type of logic device capable of performing a desired image processing function on digital image data. For example, the image processor 16 may be a microprocessor programmed to perform a desired function, a specially designed ASIC, a programmable logic array, or any other suitable processing device. The image processor 16 manipulates the pixel values according to the particular function to be carried out by the image processing system 10. Depending on the function performed by the image processing system 10, the image processor 16 may need to access pixel values from one or more pixels several times over the course of processing a particular image. Accessing the image storage memory 12 over and over again to read and re-read the pixel values from the same pixels is very inefficient from a processing point of view. Accordingly, pixel values are read from the image storage memory 12 and temporarily stored in the buffer memory 14. Because of differences in the size and structure of the buffer memory 14 and the image storage memory 12, it is much more efficient for the image processor 16 to access pixel values from the buffer memory 14 than from the image storage memory 12. Therefore, the pixel values are stored in the buffer memory 14 until they are no longer needed by the image processor 16. The image processor 16 may quickly access the pixel values from the buffer memory 14 as often as necessary to perform its designated function. When the image processor 16 completes all of the processing for which particular pixel values are required, the corresponding pixel values may be deleted from the buffer memory 14, and new pixel values read from the image storage memory 12 may be written in its place for the further processing of additional pixels of a given image. Processed pixel values output from the processor 16 may be stored in a separate image storage memory 18 or may be provided to the next processing stage of a larger image processing system.

Figures 2, 3:
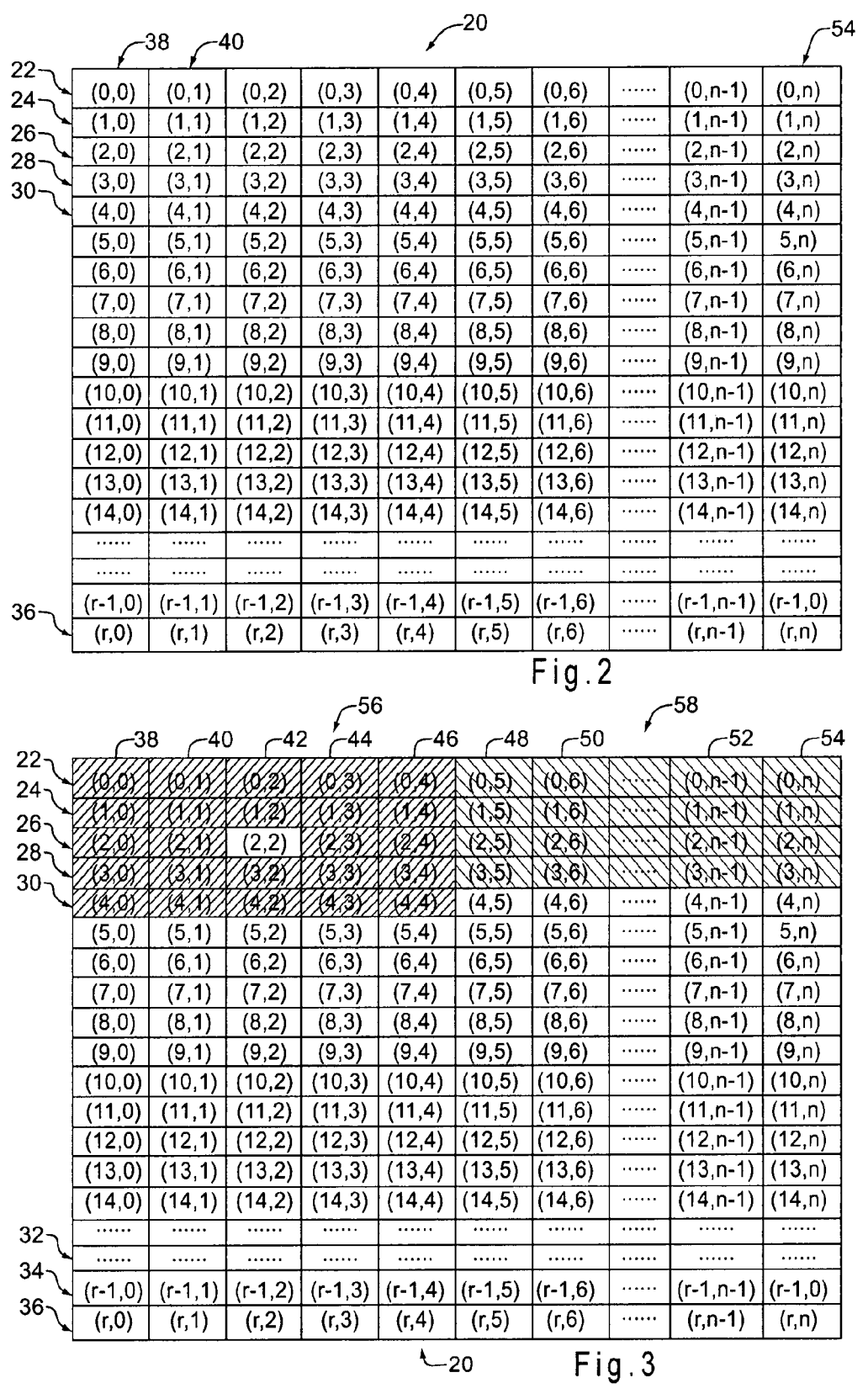

FIG. 2 shows a typical pixel array 20 for a digital image. The pixel array 20 comprises an r×n array of pixels, where r is the number of horizontal rows of pixels within the digital image, and n is the number of pixels within each row. Examples of typical digital image formats include 10,200× 13,200 (for 8.5"×11" at 1200 dpi), 5,100×6,600 (for 8.5"×11" at 600 dpi), 1,920×1,080 (for HDTV), and 1,280×720 (for HDTV) pixel arrays. Many other digital image formats exist. Whatever the format, one or more numeric values may be associated with each pixel to identify color and/or intensity. When the appropriate colors are printed or displayed at the proper locations and at the proper intensity, the pixels collectively form a digital image.

When processing digital images, pixel values are typically read and processed line by line in a rasterized pattern from left to right and from top to bottom. Processing the pixel values in the pixel array 20 in this manner, the pixel values from a first row of pixels 22 is read from left to right starting with the pixel (0, 0) in the first, leftmost column 38, followed by the pixel (0, 1) in the second column 40, and so on until the last pixel in the first row 22, pixel (0, n) in the rightmost column 54, has been read. Thereafter the pixel values from the second row 24 is read from left to right starting with the pixel (1, 0) in the first column 38 and ending with the pixel (1, n) in the last column 54, and so on until the last pixel (r, n) in the last column 54 of the last row 36 has been read.

Often a particular image processing operation will require pixel values from pixels located on different rows of the digital image pixel array 20. For example, a filtering operation may be employed to adjust the values associated with individual pixels based on the values of surrounding pixels. Such a filtering operation may require pixel values from an area that covers several rows and several columns of the image pixel array 20. FIG. 3 illustrates a filtering operation based on a 5×5 pixel filtering array 56. Other filtering operations may employ a 3×3 pixel filtering array or some other grouping of pixels. FIG. 3 shows the same r×n image pixel array 20 as shown in FIG. 2. A 5×5 pixel filtering array 56 (darkly shaded) is shown in the upper left corner of the image pixel array 20. The pixel at the center of the 5×5 pixel filtering array, in this case pixel (2, 2) may be defined as the "pixel of interest" for the filtering operation when the filtering array 56 is in the position shown in FIG. 3. The pixel of interest is the pixel whose value will be adjusted based on the values of the other pixels in the filtering array 56, according to the filtering algorithm. Once the filtered value of the pixel of interest has been calculated, the position of the 5×5 pixel filtering array 56 may be shifted and a new pixel of interest may be considered based on a new set of surrounding pixel values.

According to many filtering algorithms, the filtered value of the pixel of interest may not be calculated unless there is a full complement of pixel values available for all of the pixels within the 5×5 pixel filtering array 56. This requirement raises a number of issues relating to which pixels within the image pixel array 20 may be processed, and the manner in which pixel values must be read from the image storage memory 12 and buffered in the buffer memory 14. In the present example, since the pixel of interest is located at the center of a 5×5 pixel filtering array 56, there must be two rows of pixel values available both above and below the pixel of interest, as well as two columns of pixel values both to the left and right of the pixel of interest. Because of this requirement, the pixel values of pixels in the first two rows 22, 24 of the image pixel array 20, the last two rows 34, 36, the first two columns 38, 40, and the last two columns 52, 54 are not processed by the processor 16. However, their values are used for purposes of calculating the filtered values of nearby pixels.

Another complicating factor is that all of the pixel values of the pixels within the filtering array 56 must be read into the buffer memory 14 before the adjusted value of the pixel of interest may be calculated. Thus, in order to calculate the filtered value of pixel (2, 2) the processor 16 must have access to the pixel values for each of the following pixels:

| (0, 0) | (0, 1) | (0, 2) | (0, 3) | (0, 4) |
|---|---|---|---|---|
| (1, 0) | (1, 1) | (1, 2) | (1, 3) | (1, 4) |
| (2, 0) | (2, 1) | (2, 2) | (2, 3) | (2, 4) |
| (3, 0) | (3, 1) | (3, 2) | (3, 3) | (3, 4) |
| (4, 0) | (4, 1) | (4, 2) | (4, 3) | (4, 4) |

Employing the raster approach to reading pixel values described above, in which pixel values are read row-by-row from left to right and from top to bottom, each of the entire first four rows 22, 24, 26, 28 of the image pixel array 20 plus the first five pixels of the fifth row 30 must be read into to buffer memory 14 before the image processor 16 may calculate the filtered value of the pixel of interest, (2, 2). If we assume 24-bit color values for each pixel and 1200 dpi spatial resolution at 8.5", each row of the image pixel array 20 will contain 244,800 bits of values. In order to store all of the values necessary to calculate the filtered value of pixel (2, 2), or any other pixel of interest, the buffer memory 14 must be capable of storing nearly 1 million bits. In addition to the pixel values corresponding to the 5×5 pixel filtering array 56, the buffer memory 14 must be capable of storing all of the remaining pixel values in the first four rows 22, 24, 26, 28 of the image pixel array 20 outside of the filtering array 56, even though these values are not used for calculating the filtered value of the pixel of interest. The extra pixels that must be stored in the buffer memory 14 are indicated by the lightly shaded area 58 of the pixel array 20 shown in FIG. 3.

Thus, using a traditional raster pattern for reading and processing pixel values requires a substantial buffer memory 14. For a particular image processing system, the specific size of the buffer memory 14 will be dictated by the color resolution (i.e., the number of bits per pixel), the spatial resolution (i.e., the dpi or the number of pixels per line), and the number of lines of pixel values necessary to perform the desired operation. Changing any of these parameters may have a significant impact on the size of buffer memory 14 required for a particular operation. For example, increasing the width of an image, or increasing the spatial resolution may greatly increase the necessary capacity of the buffer memory 14. Another complicating factor is that all of the pixel values for each of the pixels within the filtering array 56 must be read into the buffer memory 14 before the adjusted value of the pixel of interest may be calculated.

Figure 5:
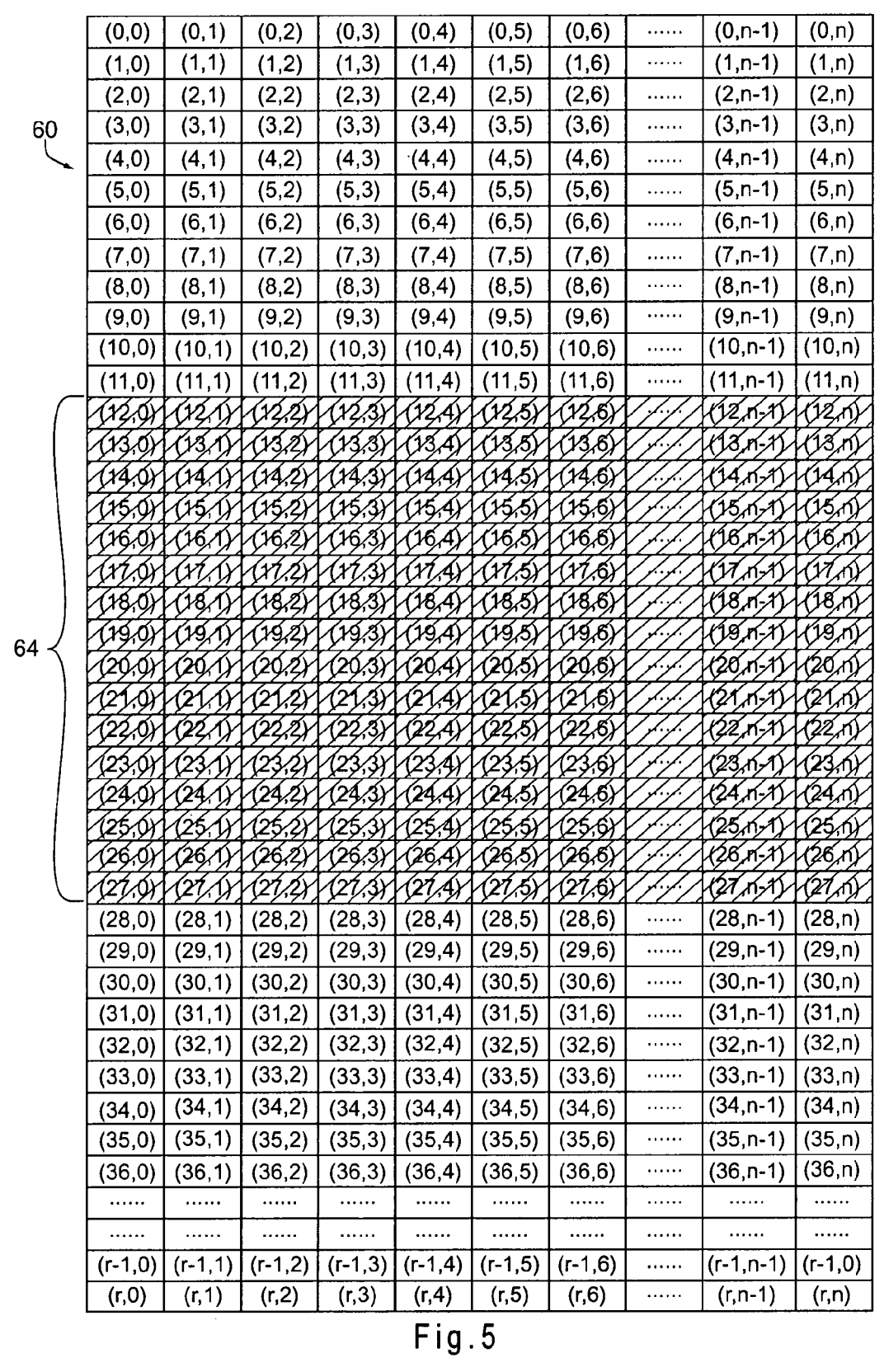

An alternative is to read and process image data in a more efficient non-raster pattern. According to an embodiment of the invention, a digital image pixel array is broken down into a plurality of overlapping horizontal pixel strips. Pixel values are read and processed according to a non-raster pattern separately within each horizontal pixel strip. FIG. 4 shows an r×n digital image pixel array 60. A first horizontal pixel strip 62 comprises the first 16 sixteen rows of pixel values within the image pixel array 60 (rows 01-15). FIG. 5 shows the same digital image pixel array 60, but with a second sixteen row horizontal pixel strip 64. The second horizontal pixel strip 64 partially overlaps the first horizontal pixel strip 62 such that rows 12-15 of the digital image pixel array 60 are included in each strip. In total, the second horizontal pixel strip includes rows 12-27 of the digital image pixel array 60.

According to one aspect of the invention, the pixel values corresponding to the pixels in each horizontal pixel strip are read from the image storage memory 12 and processed by the image processor 16 independently of one another. In other words, the pixel values relating to the pixels in the first horizontal pixel strip 62 are read from the image storage memory 12, stored in the buffer memory 14, and processed by the processor 16 as a group. When processing of the pixels within the first horizontal pixel strip is complete, processing of the pixels in the second horizontal pixel strip begins, and continues until the entire digital image pixel array 60 has been processed.

Figures 6, 7:
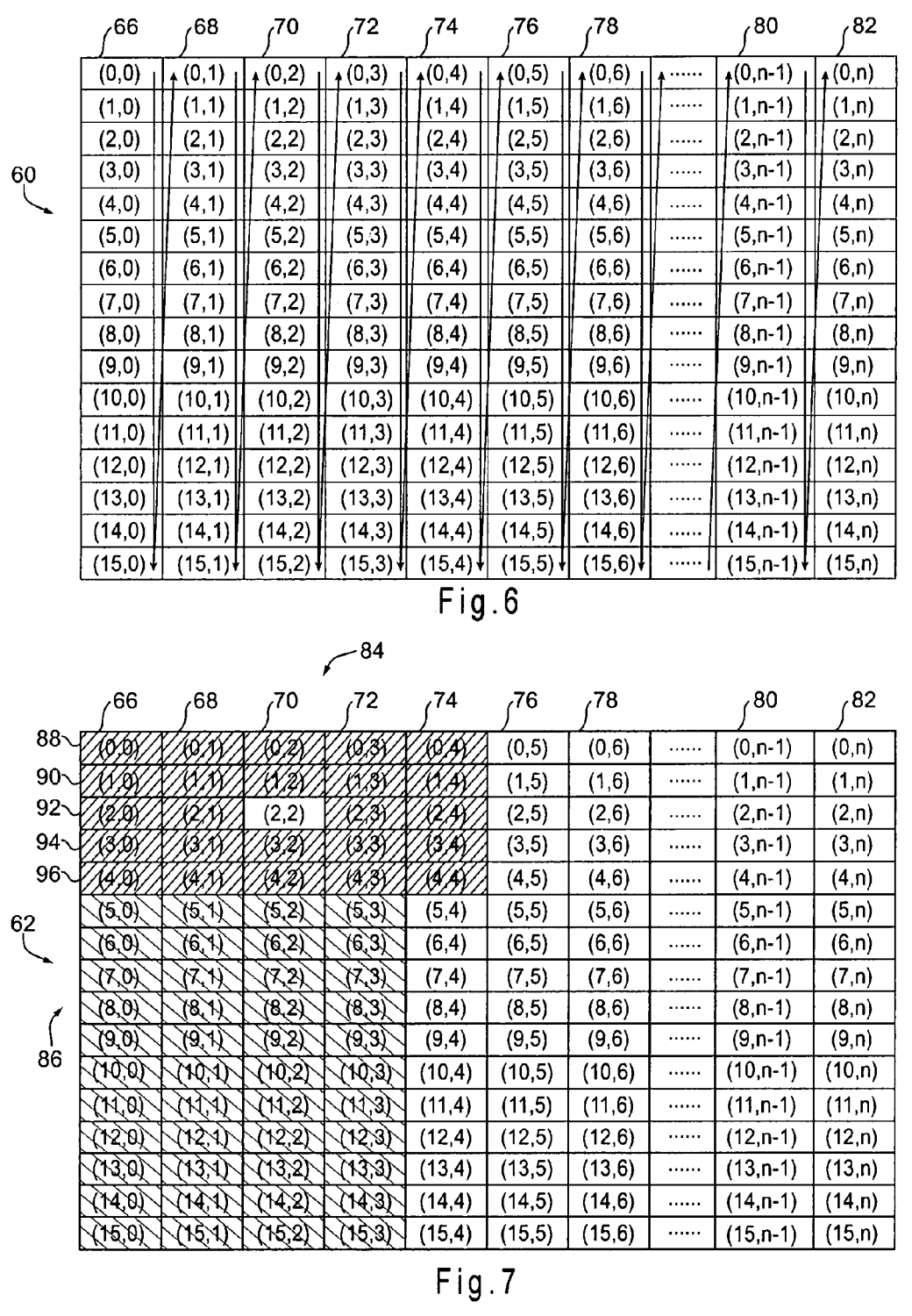

Within each horizontal strip the pixel values are read and processed according to a non-raster pattern shown in FIG. 6. Rather than reading the pixel values horizontally line-by-line, the pixel values are read in columnar fashion from top to bottom and from left to right. Thus, the pixel values for the pixels in the first column 66 are read first starting with pixel (0, 0), followed by pixel (1, 0) and so forth, ending with pixel (15, 0). Once the pixels in the first column 66 have been read, the pixels in the second column 68 are read, again in order from top to bottom. These are followed by the pixel values for the pixels in the third column 70, the fourth column 72, and so on until the pixel values for all of the pixels, within the horizontal pixel strip 62 have been read from the image storage memory 12 and stored in the buffer memory 14. The processing of the pixel values within the horizontal pixel strip 62 will be described below. For now, however, once the processing of the pixel values for the pixels within the first horizontal pixel strip is complete, pixel values for the pixels in the second horizontal pixel strip 64 may be read from the image storage memory 12, stored in the buffer memory 14, and processed in a similar manner. Reading and processing the pixel values in this manner allows the processing of the pixel values to be carried out with far less data stored in the buffer memory 14.

Consider the filtering operation described above in which individual pixel values are adjusted based on the values of surrounding pixels. This time, however, the pixel values are read from the image storage memory 12 and stored in the buffer memory 14 according to the non-raster pattern shown in FIG. 6.

FIG. 7 again shows the first horizontal pixel strip 62. A 5×5 pixel filtering array 84 is located in the upper left corner of the horizontal pixel strip 62. The filtering array 84 includes the pixels in the first five columns 66, 68, 70, 72, 74 of the first five rows 88, 90, 92, 94, 96 of the first horizontal pixel strip 62. Again, because of the 5×5 pixel size of the filtering array 84, there are two rows of pixels above and below the pixel of interest, (2, 2), and two columns of pixels to the left and right of the pixel of interest within the filtering array 84. Because the only pixels that can be processed are those having a full complement of filtering array 84 pixel values, pixel (2, 2) is the first pixel within the first horizontal pixel strip 62 that can be processed. As with the previously discussed filtering operation, the adjusted value of pixel (2, 2) cannot be calculated until the values for all of the pixels within the filtering array 84 have been read from the image storage memory 12 and stored in the buffer memory 14. Employing the non-raster pattern for reading pixel values shown in FIG. 6, pixel values from the first column of pixels 66 are read first, followed by the pixel values from the second column 68, the third column 70, the fourth column 72, and the fifth column 74.

Employing the non-raster approach to reading pixels shown in FIG. 6 may require that some extra pixel values be read from the image storage memory 12 even though they are not directly involved in calculating the filtered value of the pixel of interest. FIG. 7 shows all of the pixels that must be read from the image storage memory 12 and stored in the buffer memory 14 before the filtered value of pixel (2, 2) can be calculated. In addition to the pixel values for all of the pixels within the 5×5 pixel filtering array 84 (darkly shaded area), the pixels in the first four columns in the rows below the filtering array 84 (lightly shaded area 86) must also be read and buffered. When the value for pixel (4, 4), the last pixel in the filtering array 84, has been read and stored in the buffer memory 14, all of the pixel values necessary to calculate the filtered value of pixel (2, 2) are available. Note that in order to reach the point when the processing of pixel (2, 2) may begin, pixel values from the entire first four columns 66, 68, 70, 72 of the first horizontal pixel strip 62 plus the first five pixels of the fifth column 74 must have been read from the image storage memory 12 and stored in the buffer memory 14. Since in the present example the first horizontal strip contains sixteen rows, each column contains sixteen pixels. Thus, the total number of pixels that must be buffered in the buffer memory 14 before processing pixel (2, 2) begins, is four columns times sixteen pixels per column plus five, or a total of sixty-nine pixels. Again, assuming 24-bit color values, a grand total of 1,656 bits must be buffered in order to calculate the filtered value of pixel (2, 2). This is a significant improvement over the nearly 1 million bits buffered when the pixel values were read using the traditional raster pattern described above. Furthermore, this value is independent of the length of each row and the spatial resolution. Changing the width of the image format, or changing the desired spatial resolution will have no impact on how many pixels must be buffered in order to process a pixel of interest.

Figures 8, 9:
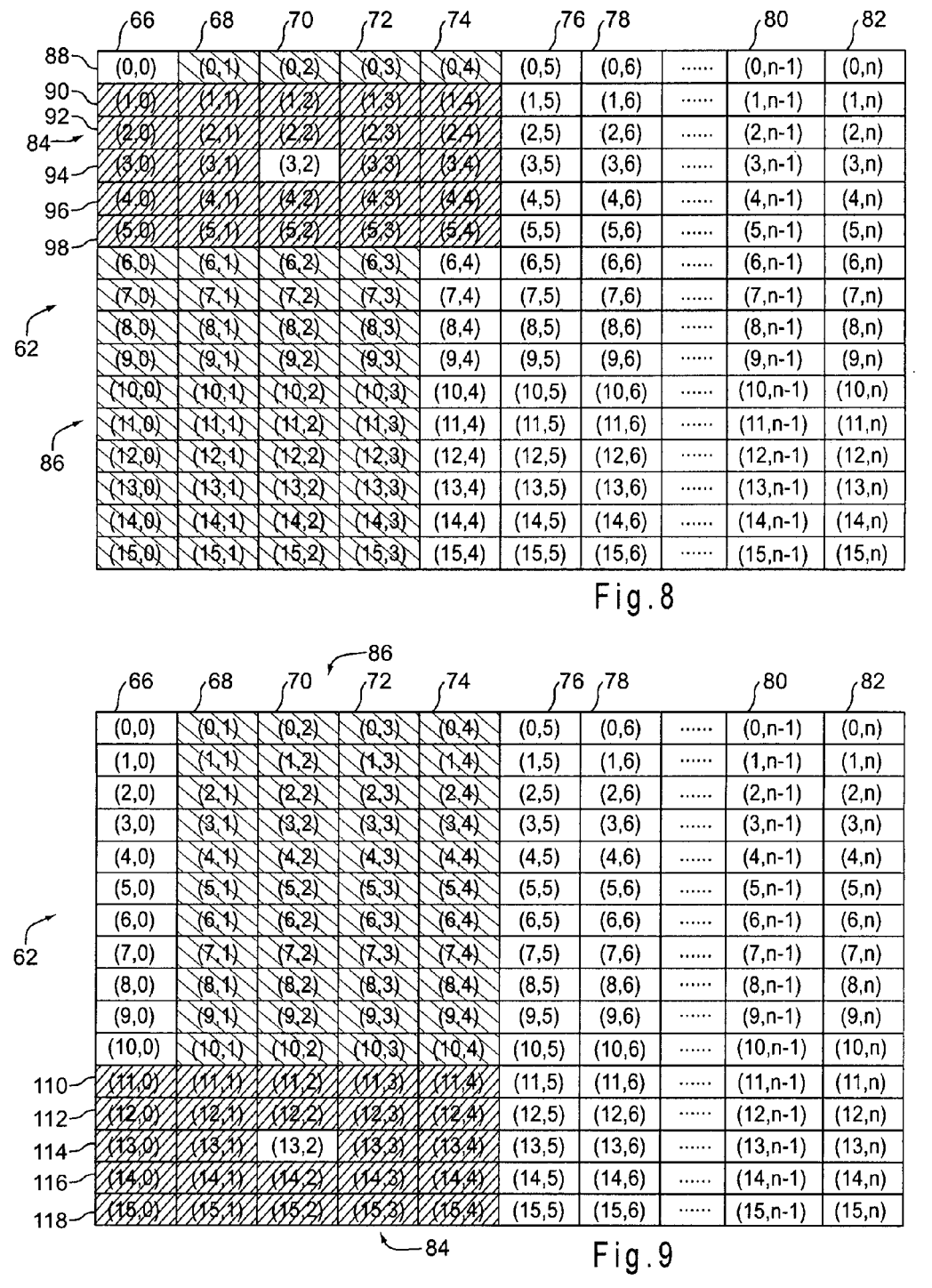

The pixels within the first horizontal pixel strip 62 are processed according to the same non-raster pattern in which the pixel values are read from the image storage memory 12. Thus, once the filtered value of pixel (2, 2) has been calculated, processing moves on to pixel (3, 2). As shown in FIG. 8, the filtering array (darkly shaded region 84) is shifted downward by one row. The new pixel of interest at the center of the shifted filtering array 84 is pixel (3, 2). Comparing FIGS. 7 and 8 we can see that all of the pixels but one necessary to process pixel (3, 2) have already been read from the image storage memory 12 and stored in the buffer memory 14 over the course of processing pixel (2, 2). Processing pixel (3, 2) requires buffering only one additional pixel, namely pixel (5, 4). The buffered value of pixel (0, 0) is not used for calculating the filtered value of any other pixel in the first horizontal pixel strip 62, and may be discarded. The remaining buffered values, including those associated with pixels outside the current position of the filtering array 84, will be used in calculating the filtered value of other pixels of interest. Therefore, the pixel values associated with the pixels in the lightly shaded areas 86 of FIG. 8 are maintained in the buffer memory 14 while pixel (3, 2) is being processed. Continuing in this manner, as each subsequent pixel is processed, one additional pixel value is read from the image storage memory 12 into the buffer memory 14, and one pixel value may be discarded. Thus, the capacity of the buffer memory 14 need not exceed 1,656 bits. This value is independent of the width of the image, and the total number of pixels per row.

Once the filtered value of pixel (3, 2) has been calculated, processing moves on to pixel (4, 2), then to pixel (5, 2) and so on down the third column 70 of the first horizontal pixel strip 62. Again, because a full complement of twenty-four surrounding pixel values must be present in order to calculate the filtered value of a pixel of interest, the last pixel that may be processed in the third column 70 of the first horizontal pixel strip 62 is pixel (13, 2), as shown in FIG. 9. Pixels in the last two rows 116, 118 cannot be processed with the other pixels of the first horizontal pixel strip since there is an insufficient number of surrounding pixels.

Once pixel (13, 2) has been processed, processing moves back up to the top of the next column to the right, i.e. to the top of the fourth column 72 of the first horizontal pixel strip so that the next pixel processed is pixel (2, 3) as shown in FIG. 10. The pixels in the first column 66 are no longer needed for processing additional filtered pixel values. However, the pixel values in columns 68, 70, 72, and 74 plus the first five pixels of column 76 are buffered in the manner described above and the processing of the pixels in column 72 proceeds. Processing continues in this manner until all of the pixels that may be processed within the first horizontal pixel strip 62 have been processed. At that point, all of the pixel values in the buffer memory relating to the first horizontal pixel strip may be discarded, and processing of the next strip may begin.

The second horizontal pixel strip 64 is shown in FIG. 11. The second horizontal pixel strip 64 contains 16 rows of pixel values and spans the entire width of the digital image pixel array. The second horizontal pixel strip 64 overlaps the first horizontal pixel strip 62. The second horizontal pixel strip begins at row 12 and extends through row 27. Employing the same 5×5 filtering array 84, the first pixel that may be processed in the second horizontal pixel strip 64 is pixel (14, 2). Recall from FIG. 9 that pixel (13, 2) was the last pixel processed in the third column 70 of the first horizontal pixel strip 62. Thus, although the second horizontal pixel strip 64 includes several of the same rows of pixels as the first horizontal pixel strip 62, the actual processing of pixels within the second horizontal pixel strip 64 picks up exactly where the processing of pixels left off in the first horizontal pixel strip 62. As with the processing of the first pixel in the first strip, the processing of pixel (14, 2) cannot begin until the pixel values for the first four columns plus the first 5 pixels of the fifth column are read from the image storage memory 12 and temporarily stored in the buffer memory 14. Again, this requires storing only 1,656 bits at a time in the buffer memory 14. Succeeding pixels are processed in the second horizontal pixel strip 64 in the same manner described above for the first horizontal pixel strip 62. When processing of all the pixels that may be processed in the second horizontal pixel strip 64 is complete, processing beings on a third horizontal pixel strip, and so on until all pixels in the digital image pixel array that may be processed have in fact been processed.

The method of processing pixels just described has a distinct advantage over processing pixels row-by-row in a traditional raster pattern in that the buffer memory 14 may be much smaller than a buffer memory required to hold several complete rows of pixel values. The present method has the further advantage that the size of the buffer memory is independent of the number of pixels in each line. Thus, the method is immune to changes in the image format or changes in the spatial resolution of the image. A compromise, however, is slightly slower performance due to the fact that values for the pixels in the overlapping portions of each horizontal pixel strip must be read twice. The adverse effects of reading pixel values more than once can be reduced by maximizing the height of each strip. If there are fewer strips necessary to cover an entire image there will be fewer overlapping rows and thus fewer pixels that will be read twice. Conversely, taller strips with more rows of pixels will require a larger buffer memory, so there is a tradeoff between performance and hardware that must be considered when implementing the process. For example, a strip having 16 rows can process 12 out of the 16 rows, and is therefore 75% efficient. A strip having 40 rows can process 36 out of the 40 rows, and is therefore 90% efficient. Even at 40 rows, however, the buffer space needed is only 0.4% of the buffer space needed for raster processing.

Figure 12:
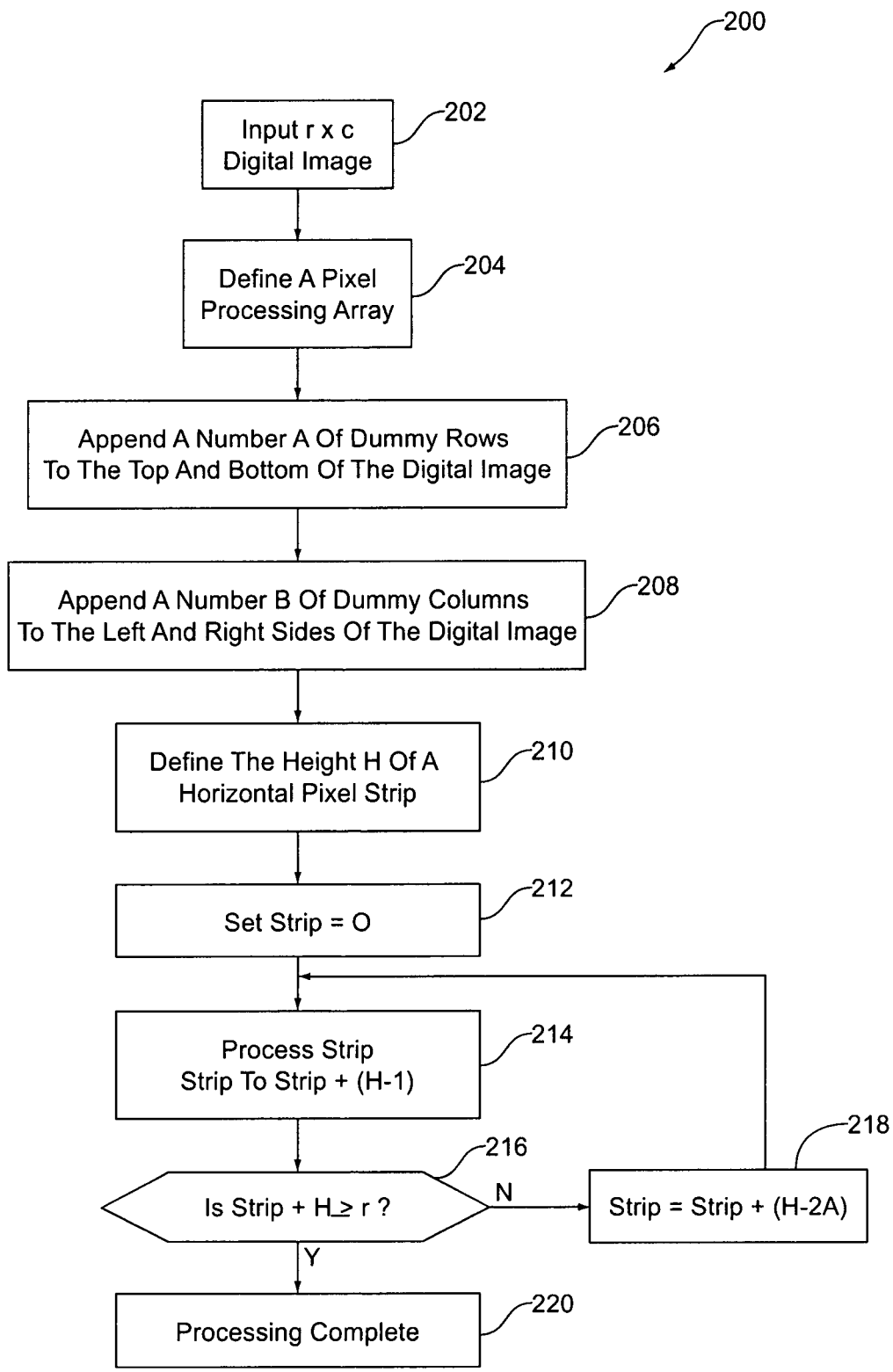
FIG. 12 is flowchart showing a method of filtering a digital image.

FIG. 12 is a flowchart 200 illustrating a method for filtering a digital image according to the invention. A digital image in the form of an r×c pixel array is received at 202, r is the number of rows of pixels in the pixel array, and c is the number of columns. A pixel processing array is defined at 204. The pixel processing array defines a moveable processing area such that when the pixel processing array is in a particular location, pixels that fall within the bounds of the pixel processing area contribute to the calculation of a filtered value of a particular pixel. Pixels outside the pixel processing area do not contribute to the calculation of the filtered value. Thus, the pixel whose value is adjusted and surrounding pixels whose values contribute to the calculation will be determined by the location of the moveable processing area.

Next, at 206 dummy pixel rows are appended to the top and bottom of the r×c pixel array. The number of rows appended will depend on the size of pixel processing array defined in 204, and the processing function being performed. For example, if a 5×5 pixel processing array is defined and the process to be performed is to adjust the value of the pixel at the center of the pixel processing array based on the value of the other pixels within the pixel processing array, the pixel at the center of the 5×5 processing array will have two rows of pixels above it, and two rows of pixels below. Therefore, in order to adjust pixels in the top row of the image, two rows of additional pixels must be added to the top of the digital image so that the pixels in what was formerly the top row of the image may occupy the center of the processing array when the processing array is located at the top of the image. If only a 3×3 processing array were defined, only one row of dummy pixels would need to be appended. Conversely, a 7×7 processing array would require 3 appended dummy rows, and so forth. The number of dummy rows to be appended to the bottom of the image is determined in a like manner. The dummy rows may simply duplicate an existing row or consist of a constant value associated with black, white, or grey. Other techniques to define dummy rows may be used depending on the application.

At 208, dummy columns are appended to left and right sides of the digital image pixel array. Again, the number of dummy columns to be appended to the pixel array will depend on the size of the processing array and the processing function being performed. Again, assuming a 5×5 pixel processing array, and a filtering process in which the pixel at the center of the processing array is adjusted based on the value of the surrounding pixels within the processing array, two columns of dummy pixels must be appended to the left side of the image and two columns to the right. A 3×3 pixel processing array would require the addition of only a single column on each side of the image, and so forth. Again, the dummy columns may simply duplicate an existing column, consist of a constant value, or be defined in another way depending on the application.

The digital image pixel array is to be divided into a plurality of horizontal pixel strips which are processed separately from one another. The height H of the horizontal pixel strips is set at 210. The height H of the horizontal pixel strips is defined in terms of the total number of pixel rows contained in each horizontal pixel strip.

At 212 a variable STRIP, identifying the first row of a horizontal pixel strip to be processed, is initialized to a value of 0. The corresponding horizontal pixel strip is processed at 214. A more in depth description of the processing of the horizontal pixel strip processing steps is provided in FIG. 13 and will be described below. For now when processing of the horizontal pixel strip is complete a determination is made whether the strip that has just been processed is the last strip in the image pixel array. If the value of variable STRIP plus the height H of each strip is greater than the value R (the total number of pixel rows in the expanded digital image pixel area) then there are no more horizontal pixel strips to be processed, and processing is complete at 220. Otherwise, the variable STRIP is incremented by an amount equal to the height of each strip minus the number of rows appended to the top and bottom of the digital image at 218. This new value of the variable STRIP identifies the first row of the next horizontal pixel strip to be processed. Processing returns to 214 and the next strip is processed.

Figure 13:
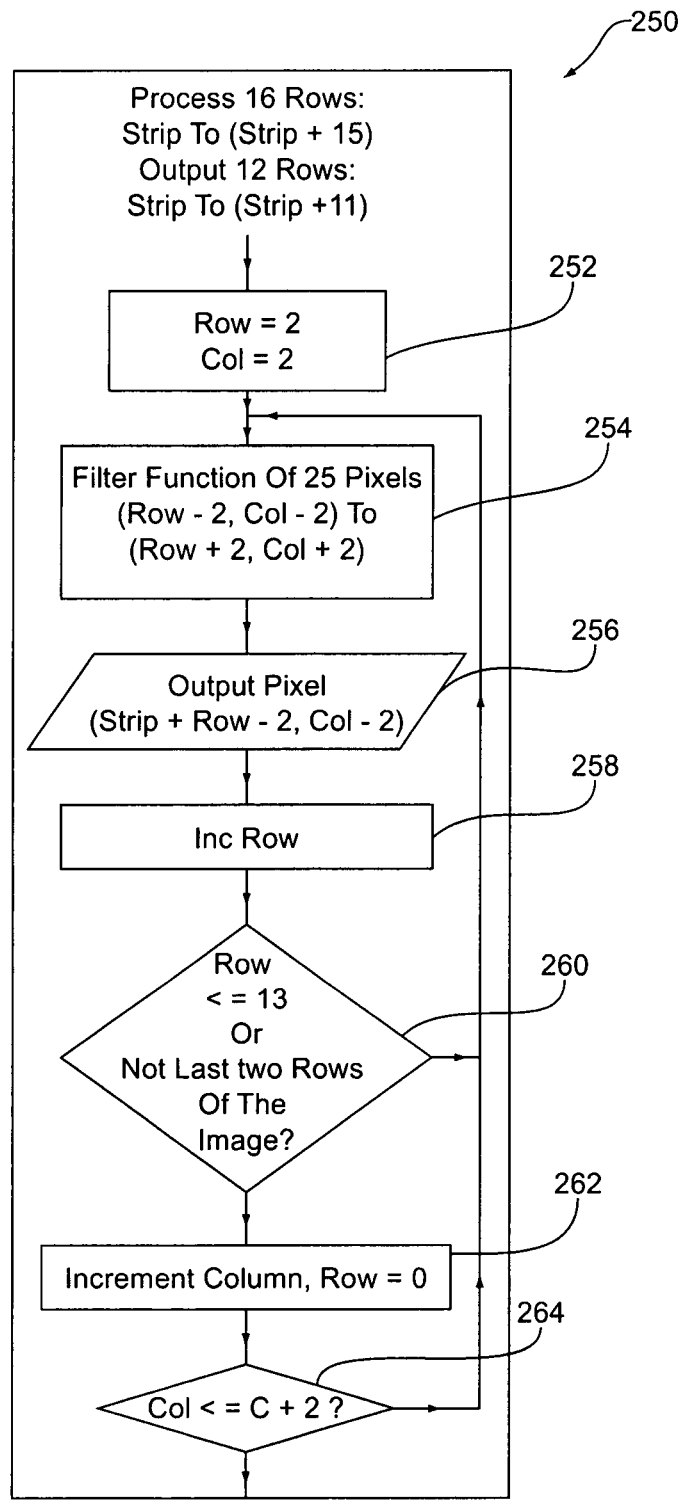
FIG. 13 is a more detailed flowchart showing the processing of individual pixels within a horizontal pixel strip according a preferred embodiment.

FIG. 13 is a flowchart describing in detail the processing of a horizontal pixel strip in a digital image filtering operation (block 214 in FIG. 12) of a preferred embodiment. The processing shown in FIG. 13 assumes a horizontal pixel strip of 16 rows. The process outputs 12 rows of filtered pixel values. For convenience, the process illustrated in FIG. 13 is limited to a filtering process employing a 5×5 pixel filtering array. Since a 5×5 pixel filtering array is employed, it is assumed that two rows of dummy pixels have been added to the top and bottom of the image, and that two columns of dummy pixels have been added to the left and right sides. Thus, the first pixel of interest, which is the first pixel with actual image data, is pixel (2,2). Accordingly, the variables Row and Col., are both initialized to 2 at 252. A filter function is implemented at 254. The filter function is based on all 25 pixels of the filtering array of which the pixel of interest is at the center. Thus, as shown at 254, the filter function incorporates the pixels from (Row−2, Col.−2), to (Row+2, Col.+2), i.e., from pixel (0,0) to pixel (4,4) (see FIG. 3). The output value calculated at 254 is output to the output pixel defined by (Strip+Row−2, Col.−2) at 256; in other words, for the first horizontal pixel strip, pixel (0,0) of the output image. The variable Row is incremented at 258. At 260, a determination is made whether the incremented value or the variable Row is less than or equal to 13 or whether it is not at last two rows of the image. If so, there are additional pixels in the present column of the current horizontal pixel strip yet to be calculated. In this case, processing returns to 254 where the filtering function is applied to the next pixel of interest. If not, the current column is complete and the variable Col. is incremented at 262. At 264, it is determined whether the incremented value of Col. is less than or equal to the width of the original image. If not, processing returns to 254 and the next column is processed. If so, processing of the horizontal pixel strip is complete.

It should be noted, that the filtering method described in FIGS. 12 and 13 is exemplary only. Many other image processing functions may be performed employing the systems and methods disclosed herein. For example, other filtering operations using different sized processing arrays, scaling functions and others may be performed more efficiently using non raster row pixel processing.

All of the discussion above, regardless of the particular implementation being described, is exemplary in nature, rather than limiting. For example, although selected aspects, features, or components of the implementations are depicted as hardware or software, all or part of the systems and methods consistent with the digital image processing system 10 may be stored on, distributed across, or read from machine-readable media, for example, secondary storage devices such as hard disks, floppy disks, and CD-ROMs; a signal received from a network; or other forms of ROM or RAM either currently known or later developed.

Furthermore, although specific components of the digital image processing system 10 are described, methods, systems, and articles of manufacture consistent with the system may include additional or different components. For example, any of the steps in FIG. 12 may be implemented by one or more of: control logic, hardware, a microprocessor, microcontroller, application specific integrated circuit (ASIC), discrete logic, or a combination of circuits and/or logic. Any act or combination of acts may be stored as instructions in computer readable storage medium. Memories may be DRAM, SRAM, Flash or any other type of memory. Programs may be parts of a single program, separate programs, or distributed across several memories and processors.

It is intended that the foregoing detailed description be understood as an illustration of selected forms that the invention can take, and not as a definition of the invention. It is only the following claims, including all equivalents, that are intended to define the scope of this invention.

The invention claimed is:

1. A system for processing digital image data comprising:
a buffer memory; and
an image processor configured to:
select a first pixel, and read from an image storage memory, according to a non-raster pattern, pixel data corresponding to the first selected pixel and a first set of surrounding pixels surrounding the first selected pixel;

store, in the buffer memory, pixel data corresponding to the first selected pixel and the first set of surrounding pixels;

access, from the buffer memory, pixel data corresponding to the first selected pixel and the first set of surrounding pixels;

adjust the pixel data corresponding to the first selected pixel based on the pixel data corresponding to the first set of surrounding pixels;

select a second pixel, and read from the image storage memory, according to a non-raster pattern, pixel data corresponding to the second selected pixel and a second set of surrounding pixels surrounding the second selected pixel, wherein the second selected pixel is selected such that at least one pixel is commonly shared between the second set of surrounding pixels and the first set of surrounding pixels;

store, in the buffer memory, pixel data corresponding to the second selected pixel and the second set of surrounding pixels;

access, from the buffer memory, the pixel data corresponding to the second selected pixel and the second set of surrounding pixels, and adjust the pixel data corresponding to the second selected pixel based on the pixel data corresponding to the second set of surrounding pixels.

2. The system of claim 1 wherein the image storage memory is configured to store the pixel data corresponding to the first selected pixel and the first set of surrounding pixels as a first pixel strip and store the pixel data corresponding to the second selected pixel and the second set of surrounding pixels as a second pixel strip.

3. The system of claim 1 wherein the image processor is configured to select the second selected pixel such that the first set of surrounding pixels includes the second selected pixel and the second set of surrounding pixels includes the first selected pixel.

4. The system of claim 1 wherein the non-raster pattern is a column-by-column pattern.

5. The system of claim 1 wherein the image processor is adapted to perform the image processing function within a device selected from a group consisting of a digital scanner, a digital copier, and a digital printer.

6. The system of claim 1 wherein the buffer memory comprises a static random access memory.

7. A system for processing digital image data comprising:
means for selecting a first pixel, and reading, according to a non-raster pattern, pixel data corresponding to the first pixel and a first set of nearby pixels;

means for storing pixel data corresponding to the first pixel and the first set of nearby pixels in a buffer memory;

means for accessing the buffer memory for reading the pixel data corresponding to the first pixel and the first set of nearby pixels, and performing an image processing function on a the pixel data corresponding to the first pixel to adjust the pixel data corresponding to the first pixel based on the pixel data corresponding to the first set of nearby pixels;

means for selecting a second pixel, and reading, according to a non-raster pattern, pixel data corresponding to the second pixel and a second set of nearby pixels, wherein the second pixel is selected such that at least one pixel is commonly shared between the second set of nearby pixels and the first set of nearby pixels means for storing pixel data corresponding to the second pixel and the second set of nearby pixels in a buffer memory;

means for accessing the buffer memory for reading the pixel data corresponding to the second pixel and the second set of nearby pixels, and performing the image processing function on the pixel data corresponding to the second pixel to adjust the pixel data corresponding to the second pixel based on the second set of nearby pixels.

8. The system of claim 7 further comprising means for storing the pixel data corresponding to the first pixel and the first set of nearby pixels as a first pixel strip and store the pixel data corresponding to the second pixel and the second set of nearby pixels as a second pixel strip.

9. The system of claim 7 wherein the means for selecting selects the second pixel such that the first set of nearby pixels includes the second pixel and the second set of nearby pixels includes the first pixel.

10. The system of claim 7 wherein the non-raster pattern is a column-by-column pattern.

11. The system of claim 7 comprising means for performing the image processing function within a device selected from a group consisting of a digital scanner, a digital copier, and a digital printer.

12. The system of claim 7 wherein the means for storing the pixel data comprises a buffer memory.

13. A method of processing pixel values, the method comprising:
selecting a first pixel, and reading, in a non-raster pattern, pixel data corresponding to the first pixel and a first set of surrounding pixels surrounding the first pixel;

storing, in a memory, pixel data corresponding to the first pixel and the first set of surrounding pixels;

performing an image processing function on the pixel data corresponding to the first pixel based on the first set of surrounding pixels, wherein the image processing function includes a moveable processing array that determines an adjusted value of the first pixel when the first pixel is at a center of the moveable processing array;

selecting a second pixel, and reading, in a non-raster pattern, pixel data corresponding to the second pixel and a second set of surrounding pixels surrounding the second pixel, wherein the second pixel is selected such that at least one pixel is commonly shared between the second set of surrounding pixels and the first set of surrounding pixels;

storing, in the memory pixel data corresponding to the second pixel and the second set of surrounding pixels; and performing the image processing function on the pixel data corresponding to the second pixel based on the second set of surrounding pixels.

14. The method of claim 13 comprising reading the pixel data corresponding to the first pixel and the first set of surrounding pixels as a first pixel strip, and reading the pixel data corresponding to the second pixel and the second set of surrounding pixels as a second pixel strip.

15. The method of claim 13 wherein the image processing function includes the moveable processing array that determines an adjusted value of the second pixel when the second pixel is at the center of the moveable processing array and the first pixel is included in the moveable processing array.

16. The method of claim 13 wherein the non-raster pattern is a column-by-column pattern.

17. The method of claim 13 comprising performing the image processing function within a device selected from a group consisting of a digital scanner, a digital copier, and a digital printer.

18. The method of claim 13 comprising storing in a static random access memory the pixel data corresponding to the first pixel and second pixel.

19. A non-transitory computer readable storage medium having processor executable instructions to:
  selecting a first pixel, and reading, in a non-raster pattern, pixel data corresponding to the first pixel and a first set of surrounding pixels surrounding the first pixel;
  store, in a memory, pixel data corresponding to the first pixel and the first set of surrounding pixels, and perform an image processing function on the pixel data corresponding to the first pixel selected from the memory based on the first set of surrounding pixels, wherein the image processing function includes a moveable processing array that determines an adjusted value of the first pixel when the first pixel is at a center of the moveable processing array; and
  selecting a second pixel, and reading, in a non-raster pattern, pixel data corresponding to the second pixel and a second set of surrounding pixels surrounding the second pixel, wherein the second pixel is selected such that at least one pixel is commonly shared between the second set of surrounding pixels and the first set of surrounding pixels;
  store, in the memory, pixel data corresponding to the second pixel and the second set of surrounding pixels, and perform the image processing function on the pixel data corresponding to the second pixel based on the second set of surrounding pixels.

20. The computer readable storage medium of claim 19 having processor executable instructions to read the pixel data corresponding to the first pixel and the first set of surrounding pixels as a first pixel strip, and to read the pixel data corresponding to the second pixel and the second set of surrounding pixels as a second pixel strip.

21. The computer readable storage medium of claim 19 having processor executable instructions to perform the image processing function on the pixel data corresponding to the second pixel when the moveable processing array includes the second pixel at the center of the moveable processing array and the first pixel at another location of the moveable processing array.

22. The computer readable storage medium of claim 19 wherein the non-raster pattern is a column-by-column pattern.

23. The computer readable storage medium of claim 19 having processor executable instructions to perform the image processing function within a device selected from a group consisting of a digital scanner, a digital copier, and a digital printer.

24. The computer readable storage medium of claim 19 wherein the memory comprises a static random access memory.

25. A system for processing a digital image comprising:
  a buffer storage device; and
  an image processor adapted to:
    read, from an image storage memory, a first plurality of pixels according to a non-raster pattern and write the first plurality of pixels to the buffer storage device,
    calculate a first new value for a first pixel of interest selected from the first plurality of pixels;
    read, from the image storage memory, a second plurality of pixels according to the non-raster pattern and write the second plurality of pixels to the buffer storage device, wherein at least one pixel is commonly shared between the second plurality of pixels and the first plurality of pixels; and
    calculate a second new value for a second pixel of interest selected from the second plurality of pixels.

26. The system of claim 25 wherein the non-raster pattern is a column-by-column pattern.

27. The system of claim 25 wherein the image processor is adapted to calculate the first new value based on a subset of the first plurality of pixels surrounding the first pixel of interest.

28. The system of claim 25 wherein the image processor is adapted to overwrite the first plurality of pixels with the second plurality of pixels.

29. The system of claim 25 wherein the image processor is adapted to iteratively change a position of a processing array within the first plurality of pixels.

30. The system of claim 25 wherein the image processor is adapted to select the first plurality of pixels based on a vertical size of a processing array.

31. A system for processing a digital image comprising:
  means for:
    reading, from an image storage memory, a first plurality of pixels according to a non-raster patter, and
    reading, from the image storage memory, a second plurality of pixels according to the non-raster pattern, wherein at least one pixel is commonly shared between the second plurality of pixels and the first plurality of pixels;
  means for storing the first plurality of pixels; and
  means for:
    determining a first new value for a first pixel of interest selected from the first plurality of pixels based on a moveable processing array at a first position, and
    determining a second new value for a second pixel of interest selected from the second plurality of pixels based on the moveable processing array at a second position, wherein the moveable processing array at the second position includes the first pixel of interest.

32. The system of claim 31 wherein the non-raster pattern is a column-by-column pattern.

33. The system of claim 31 comprising means for iteratively changing a position of the moveable processing array within the first plurality of pixels.

34. The system of claim 31 comprising means for selecting the first plurality of pixels based on a vertical size of the moveable processing array.

35. A method of processing a digital image comprising:
  storing a first plurality of pixels read from an image storage memory according to a non raster pattern;
  determining a first new value for a pixel of interest selected from the first plurality of pixels based on a moveable processing array;
  iteratively changing a position of the moveable processing array within the first plurality of pixels; and
  storing a second plurality of pixels read from the image storage memory according to the non-raster pattern, wherein at least one pixel is commonly shared between the second plurality of pixels and the first plurality of pixels in the image storage memory.

36. The method of claim 35 wherein the non-raster pattern is a column-by-column pattern.

37. The method of claim 35 comprising overwriting the first plurality of pixels with the second plurality of pixels.

38. The method of claim 35 wherein the first plurality of pixels is selected based on a vertical size of the moveable processing array.

39. A non-transitory computer readable storage medium having processor executable instructions to:
- store a first plurality of pixels read from an image storage memory according to a non-raster pattern,
- process the first plurality of pixels,
- iteratively change a position of a processing array within the first plurality of pixels, and
- store a second plurality of pixels read from the image storage memory according to the non-raster pattern, wherein at least one pixel is commonly shared between the second plurality of pixels and the first plurality of pixels in the image storage memory.

40. The computer readable storage medium of claim 39 wherein the non-raster pattern is a column-by-column pattern.

41. The computer readable storage medium of claim 39 having processor executable instructions to determine a pixel value based on a subset of the first plurality of pixels.

42. The computer readable storage medium of claim 39 having processor executable instructions to select the first plurality of pixels based on a vertical size of a processing array.

* * * * *